UNITED STATES PATENT OFFICE.

HENRY W. JOHNS, OF NEW YORK, N. Y.

IMPROVEMENT IN COMPOUNDS FOR ROOFING AND OTHER PURPOSES.

Specification forming part of Letters Patent No. 76,773, dated April 14, 1868; reissue No. 5,949, dated June 30, 1874; application filed May 1, 1874.

DIVISION B.

*To all whom it may concern:*

Be it known that I, HENRY W. JOHNS, of the city, county, and State of New York, have invented a new and useful Composition of Matter for Roofs and other Surfaces; and that the following is a full, clear, and exact description of the same, and of the manner of preparing and using the same.

My said invention, which relates to an improved cement, mastic, or paint for coating roofs, and other surfaces, consists in compounding asbestus, which is the characteristic ingredient, with mineral or vegetable pitch or tar, bitumen, resin, or equivalent gums, and pigments when special colors are required or desired.

The asbestus is reduced to a powder or fiber by any of the well-known methods, and after being so prepared it is mixed with mineral pitch, when in the melted state, in the proportion of six pounds of asbestus to ten pounds of bitumen. After these ingredients have been thoroughly mixed the compound can be permitted to cool and solidify, and may be kept or transported for use, and will then simply require to be melted, or the mixture can be made when required for use. By increasing or reducing the proportion of pitch the compound when melted will be more or less fluid, according to the intended use; but, if desired, to produce the compound so that it will remain of the required consistency for use at the ordinary temperature of the atmosphere, I substitute mineral tar or varnish or other like equivalents and thin down with naphtha, or other like equivalents.

When the compound is made with asbestus and bitumen, or any other like equivalent which solidifies at the ordinary temperature of the atmosphere, heat must be employed to effect the mixture and to apply the compound.

To give more body to the compound above described, I combine therewith marble-dust, clay, lime, sand, pulverized slate or equivalent matter in such proportions as may be deemed suitable in view of the purpose to which such coating is to be applied.

When any of the said bodies are added to the compound I have found the following proportions to produce a good result, viz: Asbestus, three pounds; mineral pitch or equivalent, one gallon; and pulverized silica or equivalent, three pounds.

What I claim as my invention, and desire to secure by Letters Patent, is—

1. The compound of asbestus and mineral pitch, prepared substantially as described, as a cement, mastic, or paint, as set forth.

2. The compound of asbestus and mineral pitch, in combination with prepared silica, for giving body to the compound, substantially as set forth.

HENRY W. JOHNS.

Witnesses:
T. W. BAXTER,
C. H. PATRICK.